(12) United States Patent
Mestanov et al.

(10) Patent No.: US 10,945,260 B2
(45) Date of Patent: Mar. 9, 2021

(54) METHODS AND NETWORK NODES FOR ENHANCED RADIO RESOURCE DEPLOYMENT

(71) Applicant: Telefonaktiebolaget LM Ericsson (publ), Stockholm (SE)

(72) Inventors: Filip Mestanov, Sollentuna (SE); Tomas Hedberg, Stockholm (SE); Oumer Teyeb, Solna (SE); Jari Vikberg, Järna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 131 days.

(21) Appl. No.: 15/113,084

(22) PCT Filed: Jan. 29, 2015

(86) PCT No.: PCT/SE2015/050096
§ 371 (c)(1),
(2) Date: Jul. 21, 2016

(87) PCT Pub. No.: WO2015/115983
PCT Pub. Date: Aug. 6, 2015

(65) Prior Publication Data
US 2017/0026960 A1 Jan. 26, 2017

Related U.S. Application Data
(60) Provisional application No. 61/934,169, filed on Jan. 31, 2014.

(51) Int. Cl.
*H04L 12/801* (2013.01)
*H04L 5/14* (2006.01)
(Continued)

(52) U.S. Cl.
CPC ... *H04W 72/0426* (2013.01); *H04W 36/0066* (2013.01); *H04W 36/165* (2013.01);
(Continued)

(58) Field of Classification Search
CPC .......... H04W 72/0426; H04W 36/165; H04W 36/0066; H04W 88/06; H04W 84/045; H04W 72/044; H04W 72/0493
See application file for complete search history.

(56) References Cited

U.S. PATENT DOCUMENTS

2009/0296635 A1* 12/2009 Hui .................... H04W 52/243
370/328
2009/0323533 A1* 12/2009 Ohta ................. H04W 36/0005
370/236
(Continued)

OTHER PUBLICATIONS

Unknown Author, "Consideration on Multi-RAT Joint Coordination", R3-131818 3GPP TSG RAN WG3#81bis Venice, Italy CMCC, Huawei, Oct. 7-11, 2013, 1-12.

*Primary Examiner* — Faruk Hamza
*Assistant Examiner* — Abusayeed M Haque
(74) *Attorney, Agent, or Firm* — Sage Patent Group (57) ABSTRACT

The present disclosure presents method, network nodes and computer program for improving a dual band user equipment, UE/STA, mobility from a first access node, e.g. an eNB, arranged to operate according to a first radio access technology to at least one second access node, e.g. a WLAN AP, arranged to operate according to a second radio access technology. A communications interface is arranged for direct communication between the first access node and the respective second access node. The method, as performed in the first access node, comprises retrieving (S32) resource management related information of the second access node relevant for the user equipment UE/STA over the communications interface. Radio resources provided to the dual-
(Continued)

mode user equipment, UE/STA, by both the first and the second access node, are coordinately controlled (S33), over the communications interface, based on the retrieved resource management related information and internal resource management related information for the first node.

37 Claims, 6 Drawing Sheets

(51) Int. Cl.
*H04W 84/18* (2009.01)
*H04L 29/06* (2006.01)
*H04W 72/04* (2009.01)
*H04W 36/00* (2009.01)
*H04W 36/16* (2009.01)
*H04W 88/06* (2009.01)
*H04W 92/20* (2009.01)
*H04W 84/04* (2009.01)

(52) U.S. Cl.
CPC .......... *H04W 84/045* (2013.01); *H04W 88/06* (2013.01); *H04W 92/20* (2013.01)

(56) References Cited

U.S. PATENT DOCUMENTS

| | | | | |
|---|---|---|---|---|
| 2011/0082937 A1* | 4/2011 | Barbaresi | ............ | H04W 36/14 709/226 |
| 2012/0082064 A1* | 4/2012 | Awoniyi | ........... | H04W 52/0206 370/255 |
| 2013/0088983 A1 | 4/2013 | Pragada et al. | | |
| 2013/0194989 A1* | 8/2013 | Centonza | ............ | H04W 36/165 370/311 |
| 2014/0036867 A1* | 2/2014 | Murai | ............... | H04W 36/0011 370/331 |
| 2014/0219162 A1* | 8/2014 | Eyuboglu | ............... | H04L 69/28 370/315 |
| 2014/0243002 A1* | 8/2014 | Muruganathan | ...... | H04L 5/0094 455/450 |
| 2014/0254355 A1* | 9/2014 | Soliman, Sr. | ...... | G06Q 30/0207 370/229 |
| 2014/0341109 A1* | 11/2014 | Cartmell | ................. | H04L 43/50 370/328 |
| 2015/0016412 A1* | 1/2015 | Horn | ...................... | H04W 36/24 370/331 |
| 2015/0173086 A1* | 6/2015 | Karaman | ............... | H04W 8/005 370/254 |
| 2015/0358990 A1* | 12/2015 | Kovacs | ............ | H04W 72/1231 370/329 |
| 2016/0092552 A1* | 3/2016 | Morfonios | .......... | G06F 11/3072 707/737 |
| 2016/0157103 A1* | 6/2016 | Teng | ...................... | H04W 16/14 370/329 |
| 2016/0269949 A1* | 9/2016 | Burstrom | ............... | H04W 24/02 |

\* cited by examiner

METHODS AND NETWORK NODES FOR ENHANCED RADIO RESOURCE DEPLOYMENT

TECHNICAL FIELD

The disclosure relates to methods and network nodes for improving user equipment mobility from a first access node, e.g. an eNB, arranged to operate according to a first radio access technology to at least one second access node, e.g. a WLAN AP, arranged to operate according to a second radio access technology. In particular, the disclosure relates to methods for direct communication between the first access node and one or more second access nodes, and to corresponding network nodes.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. The Evolved UMTS Terrestrial Radio Access Network, E-UTRAN, consists of base stations called enhanced NodeBs, eNBs or eNodeBs, providing the E-UTRA user plane and control plane protocol terminations towards the UE. The eNBs are interconnected with each other by means of the X2 interface. The eNBs are also connected by means of the S1 interface to the Evolved Packet Core, EPC.

The eNB hosts functionalities such as Radio Resource Management, RRM, radio bearer control, admission control, header compression of user plane data towards a serving gateway, and routing of user plane data towards the serving gateway.

Today user equipments, such as mobile phones, typically support other wireless technologies such as Wireless Local Area Networks, commonly referred to as WLAN, in addition to the cellular standards. As a means to improve the network capacity in future networks, WLAN is intended to be an integral part of e.g. the cellular networks.

Mobile operators are today mainly using WLAN to off-load traffic from the mobile networks but the opportunity to improve end user experience regarding performance is also becoming more important. The usage of WLAN is driven due to the free and widely unlicensed spectrum, and the increased availability of WLAN in mobile terminals like smart phones and tablets. The end users are also becoming more and more at ease with using WLAN for example at offices and homes.

The current WLAN deployments are basically totally separate from mobile networks, and are to be seen as non-integrated. However, integration of cellular and WLAN network is getting more and more important. That is, in the future, WLAN will be regarded as just another radio access technology, so that handover can be made to WLAN without the user noticing that the service is no longer being carried by 3GPP technologies like WCDMA or LTE.

There is a need to improve coordination and control of a combined cellular and WLAN network. Improved WLAN integration by introducing enhanced network controlled traffic steering between 3GPP and WLAN based on knowledge about the total situation on the different accesses with the cellular network is emerging as a good way to improve radio resource management and thereby improve end user experience further.

SUMMARY

It is an object of the present disclosure to provide embodiments providing improved coordination and control of a combined network including first access nodes arranged to operate according to a first radio access technology e.g. E-UTRA, and second access nodes arranged to operate according to a second radio access technology, e.g. WLAN.

In particular, it is an object of the disclosure to provide embodiments using a direct communications interface established between one or more second access nodes and a first access node to improve radio resource management and to provide better service to user equipment present in coverage areas of the first access node as well as of a second access node; the communications interface integrating the second access nodes with the first radio access network and toward a core network.

This object is achieved by a method performed in an first access node, a first access node configured to perform the method and a computer program run in the first access node. The object is further achieved by a method performed in a second access node, a second access node configured to perform the method and a computer program run in the second access node.

The disclosure presents a method embodiment, performed in a first access node arranged to operate according to a first radio access technology, of controlling usage of radio resources for at least one user equipment UE/STA. The UE/STA is within coverage of the first access node and also within the coverage of one or more second access nodes arranged to operate according to a second radio access technology. A communications interface is arranged for direct communication between the first access node and the respective second access node. The method comprises retrieving resource management related information of the second access node relevant for the at least one user equipment UE/STA over the communications interface. Radio resources provided to the dual-mode user equipment, UE/STA, by both the first and the second access node, are coordinately controlled based on the retrieved resource management related information and internal resource management related information for the first node.

Coordinately controlling radio resources of a first and a second access node operating according to different access technologies, provides for improved and optimize radio resource management. Using the disclosed communications interface, it is possible to communicate dynamic information between the access nodes operating according to different access technologies. The first access node having access to dynamic resource management related information is able to make informed radio access steering decisions for a particular UE/STA.

According to an aspect of the disclosure, the method further comprises sending a request for resource management related information to the second access node.

According to further aspects of the disclosure, the resource management related information is received in response to the request or without prior solicitation, e.g. in response to a report triggering event in the second access node.

According to an aspect of the disclosure, the method comprises receiving radio link related information in the first access node.

According to an aspect of the disclosure, the method further comprises transmitting radio resource control information to the second access node over the communications interface.

The disclosure also provides for direct dynamic control and configuration setting from a controlling access node, i.e. the first access node according to the disclosed method.

According to an aspect of the disclosure, the radio link related information is received from a neighboring first access node, a neighboring second access node or/and the UE/STA.

According to an aspect of the disclosure, the radio link related information is an interference indicator According to an aspect of the disclosure, the interference indicator is an uplink, UL, high interference indicator, HII or an uplink, UL, interference overload indicator, OI, received from a neighboring first access node.

According to an aspect of the disclosure, the UL HII or UL OI is a representation of an interference level from a neighboring second access node.

Exchange of interference indicators provides a capability for the first access node to consider interference from and to neighbouring cells in their scheduling decisions.

According to an aspect of the disclosure, the resource management related information represents an air load per band, backhaul load, current channel used or/and a number of on-going connections to the second access node.

According to an aspect of the disclosure, the radio resource control information comprises information on a transmission power level to be used by the second access node.

According to an aspect of the disclosure, the radio resource control information comprises information on an operating frequency to be used by the second access node.

According to an aspect of the disclosure, the radio link related information is indicative of a need to perform handover of a radio link connection established between the first access node and a UE/STA.

According to an aspect of the disclosure, the step of retrieving resource management related information for the second access node over the communications interface includes transmitting a handover request from the first access node to the second access node and receiving a handover acknowledgment from the second access node to the first access node over the communications interface.

According to an aspect of the disclosure, the handover request comprises QoS related information arranged to be used by the second access node in a reservation of resources.

According to an aspect of the disclosure, the step of coordinately controlling radio resource use comprises transmitting a handover command to the UE/STA.

According to an aspect of the disclosure, buffered and in transit packets to the second access node are forwarded over the communications interface.

According to an aspect of the disclosure, control of downlink, DL, radio link resources is decoupled from control of uplink, UL, radio link resources.

The disclosure also presents a method embodiment, performed in a second access node arranged to operate according to a second radio access technology, of controlling usage of radio resources for at least one user equipment UE/STA. The UE/STA is within coverage of the second access node and also within coverage of a first access node arranged to operate according to a first radio access technology. There is a communications interface arranged for direct communication between the second access node and the first access node. The method comprises detecting a report triggering event and sending resource management related information to the first access node over the communications interface.

According to an aspect of the disclosure, the report triggering event is receipt of a request for resource management related information from the first access node over the communications interface.

According to an aspect of the disclosure, the report triggering event is a change of load or of capacity in the second access node.

According to an aspect of the disclosure, the resource management related information includes measurements relating to one or more neighboring second access nodes, each having respective communications interfaces with the first access node.

According to an aspect of the disclosure, radio resource control information is received from the first access node over the communications interface, the radio resource control information coordinately generated based on resource management related information for the second access node, radio link related information relevant for radio link connections to the first access node, and resource management related information for the first node.

According to an aspect of the disclosure the radio link related information is relevant for radio link connections to the first access node is an interference indicator.

According to an aspect of the disclosure the radio link related information is indicative of a need to perform handover of a radio link connection established between the first access node and a UE/STA.

According to an aspect of the disclosure, the first access node is an access node of a cellular radio access network and the second access node is an access point of a local area network.

According to an aspect of the disclosure, coverage of the second access node extends over a subarea or a partial subarea of coverage provided by the first access node.

According to an aspect of the disclosure, the first access node is an access point of a local area network and the second access node is an access node of a cellular radio access network.

According to an aspect of the disclosure, coverage of the coverage of the first access node extends over a subarea or a partial subarea of coverage provided by the second access node.

The disclosure also relates to a first access node embodiment. The first access node is arranged to operate according to a first radio access technology, and being configured to control usage of radio resources for at least one user equipment, UE/STA, being within a coverage of the first access node, wherein the UE/STA is also within coverage of one or more second access nodes arranged to operate according to a second radio access technology. The first access node comprises a radio transceiver arranged for radio link communication with dual mode user equipment, UE/STA, within a coverage area of the first access node over a first radio access technology and a communication interface, W2-WLAN, arranged for direct communication with one or more second access nodes. The first access node further comprises processing circuitry, and a memory containing instructions executable by the processing circuitry. The access node is operative to retrieve resource management related information of the second access node relevant for the at least one user equipment UE/STA over the communications interface; and coordinately control radio resources provided to the dual-mode user equipment, UE/STA, by both the first and the second access node, based on the retrieved resource management related information and internal resource management related information for the first node.

According to an aspect of the disclosure, the first access node is an access node of a cellular radio access network.

The present disclosure also presents a computer program, comprising computer readable code which, when run in a first access node causes the access node to perform the disclosed method.

The disclosure also relates to a second access node embodiment. The second access node is arranged to operate according to a second radio access technology, and is configured to control usage of radio resources for at least one user equipment, UE/STA, being within a coverage of the second access node, wherein the UE/STA is also within the coverage of a first access node arranged to operate according to a first radio access technology. The second access node comprises a radio transceiver arranged for radio link communication with dual mode user equipment, UE/STA, within a coverage area of the second access node over a second radio access technology and a communication interface, W2-WLAN, arranged for direct communication with one or more first access nodes. The second access node further comprises processing circuitry and a memory containing instructions executable by the processing circuitry. The access node is operative to receive a request for resource management related information from the first access node over the communications interface and send the requested resource management related information to the first access node over the communications interface.

According to an aspect of the disclosure, the second access node is an access point of a local area network.

According to an aspect of the disclosure, the second access node is an access node of a cellular communications network.

The present disclosure also presents a computer program, comprising computer readable code which, when run in a second access node causes the access node to perform the disclosed method.

The first and second access node and respective computer programs each display advantages corresponding to the advantages already described in relation to the method performed in the first access node and the method performed in the second access node.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

Aspects of the present disclosure will be described more fully hereinafter with reference to the accompanying drawings. The methods and wireless device disclosed herein can, however, be realized in many different forms and should not be construed as being limited to the aspects set forth herein. Like numbers in the drawings refer to like elements throughout.

The general object or idea of embodiments of the present disclosure is to address at least one or some of the disadvantages with the prior art solutions described above as well as below, to improve coordination and control of a combined network including first access nodes arranged to operate according to a first radio access technology e.g. E-UTRA, and second access nodes arranged to operate according to a second radio access technology, e.g. WLAN. The various steps described below in connection with the figures should be primarily understood in a logical sense, while each step may involve the communication of one or more specific messages depending on the implementation and protocols used.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

It is an object of the present disclosure to provide embodiments solving the problem of coordinating and controlling radio resources of a wireless network having a direct communications interface between one or more second access nodes and a first access node; integrating the second access nodes with the first radio access network and toward a core network.

Figure 1:
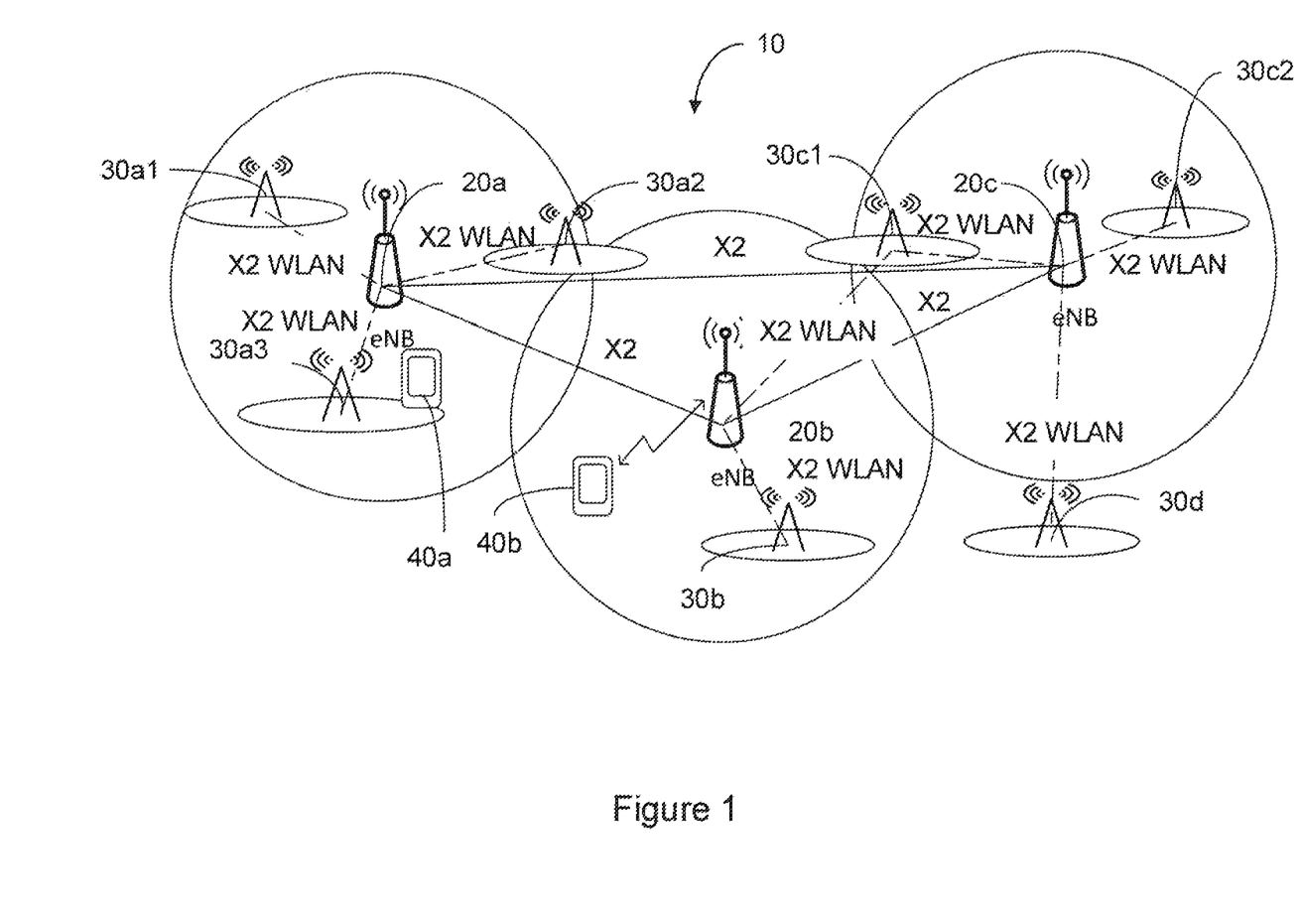
FIG. 1 schematically illustrates a cellular communication network with communications interfaces for direct node to node communication between first and second access nodes, e.g. eNBs and WLANs, operating according to respective radio access technologies.

FIG. 1 schematically illustrates a cellular communication network 10 with communications interfaces X2 and X2-WLAN. The network 10 comprises first access nodes 20, preferably configured to operate according to a 3GPP radio access technology, and second access nodes 30, preferably configured to operate according to a wireless local area network technology, WLAN, and one or more user equipments, UEs 40, e.g. a UE/STA capable of connecting to the first and the second access node as well as to communicate over multiple bands used by the access nodes.

In the illustrated example, the first access nodes 20 are eNodeBs, eNBs, operating according to 3GPP RAT and the second access nodes 30 are access points, APs, operating according to WLAN. In accordance with an aspect, the APs are dual-band (2.4 GHz and 5 GHz) APs under the coverage of one eNB cell and the APs communicate with the eNB using the X2-WLAN interface. There is a dual-mode UE/STA under the coverage of the eNB and at least one AP.

In FIG. 1, each eNB, 20a-20c, is connected to one or more WLAN access points, 30a1-30a3, 30b1-30b3, 30c1-30c3, via the communications interface X2-WLAN. The X2-WLAN interface could be set up in different ways. The eNBs 20a to 20c are interconnected by an X2 communications interface, e.g. as defined in the present standards. In the illustrated example of a wireless network, an eNB 20*a* is connected to all WLAN APs 30*a*1-30*a*3 within the coverage area of the eNB, i.e. within one or more cells of the eNB, and another eNB 20*b* is connected to an AP 30*b* within its coverage area and another AP 30*c*1 partially within its coverage area. A third eNB 20*c* is connected to an AP 30*c*2 within its coverage area, another AP 30*c*1 partially within its coverage area and a third AP 30*d* outside the coverage area, but close to a border. Naturally, the disclosure is also applicable to the situation where an eNB is connected to a subset of the AP:s within the coverage area of the eNB or having X2-WLAN connections to AP:s that are only partly within a coverage area of the eNB.

The X2-WLAN communications interface provides for enhanced coordination and control of radio resources in the combined network as will be explained in more detail below.

Figure 3:
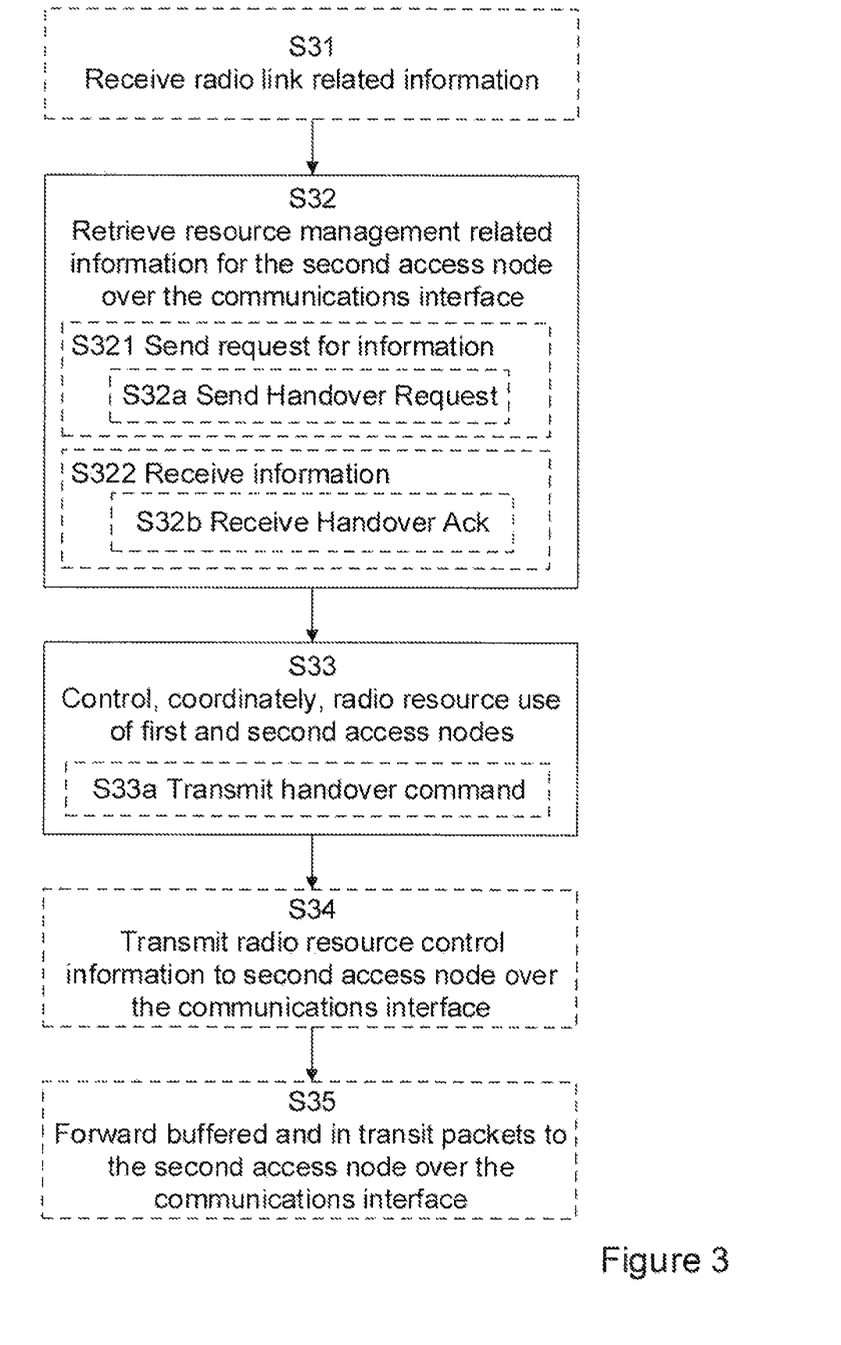
FIG. 3 is a flowchart schematically illustrating embodiments of method steps performed in a first access node, e.g. an eNB.

FIG. 3 is a flowchart schematically illustrating embodiments of method steps performed in a first access node 20, e.g. an eNB.

The disclosure presents a method embodiment, performed in a first access node 20 in a wireless network 10, of controlling radio resources. The first access node 20 is arranged to operate according to a first radio access technology and is defining a first coverage area. The first access node 20 has a communications interface, X2-WLAN, for direct communication with one or more second access nodes arranged to operate according to a second radio access technology within respective second coverage areas. A second coverage area is related to the first coverage area. According to some aspects the method comprises receiving S31, radio link related information relevant for radio link connections to the first access node. Link related information is e.g. information about link quality of connections of the first access node, e.g. measurement reports, indicative of a need to perform handover of a radio link connection established between the first access node and a UE/STA. The radio link related information is received from a neighboring first access node over the X2 interface, from a neighboring second access node over the X2-WLAN interface and/or from a UE/STA over a RAN interface. Radio link related information comprises one or more interference indicators, e.g. an uplink high interference indicator, HII, and/or an uplink overload indicator, OI, of an interference level from a neighboring access node, e.g. a neighboring first access node or a neighboring second access node.

In step S32 resource management related information is retrieved for the second access node over the communications interface. Resource management related information is any information that is usable when allocating resources. One example is link quality or interference in a cell defined by the second access node. Other examples comprises air load per band, backhaul load, current channel used or/and a number of on-going connections to the second access node.

The resource management related information is retrieved based on activities performed in the first access node or without prior solicitation from the first access node.

According to an aspect of the disclosure, the first access node retrieves the resource management related information by first sending a request for resource management related information to a second access node capable of serving the UE/STA and receiving said information in a response from the second access node. However, according to another aspect, retrieval of the resource management information also implies receiving unsolicited information from the second access node, e.g. in response to a triggering event detected in the second access node.

According to another aspect of the disclosure, retrieval of the resource management related information comprises transmission S32*a* of a handover request from the first access node to the second access node, and a receipt of a handover request acknowledgment over the X2-WLAN interface, where resource management related information, e.g. QoS related information is included in the handover request sent from the first access node to the second access node.

Then in step S33, radio resource usage of the first and the second access node for a dual-mode user equipment, UE/STA, within the first and the second coverage area is coordinately controlled based on the retrieved resource management related information, received radio link related information and internal resource management related information for the first node. According to an aspect of the disclosure, the method further comprises transmitting S34 radio resource control information to the second access node over the communications interface. Examples of radio resource control information comprise transmission power level to be used by the second access node and/or operating frequency used by the second access node.

In connection with the previously described handover situation, the coordinated control is achieved by transmitting S33*a* a handover command to the UE/STA from the first access node, whereupon buffered and "in transit" packets may be forwarded S35 to the second access node over the X2-WLAN communications interface. Coordinated control during handover will be further discussed below in relation to FIG. 2.

The coordinated control and transmission/reception of downlink, DL, radio link resources may be decoupled from control and transmission/reception of uplink, UL, radio link resources.

The LTE system has been developed in such a way that reliable communication is possible even with low signal to interference plus noise ratios (SINR), which makes it possible to deploy networks with a frequency reuse factors of 1 (i.e. neighbouring cells using the same frequency). However, a frequency reuse of one still implies that UEs near cell edges experience more interference as compared to cell centre UEs. As such, co-ordination of the scheduling between neighbouring cells is very beneficial to ensure that even cell edge UEs will get fair share of the overall cell capacity. For example, neighbouring cells can opt to use a frequency reuse of 1 only in their central region and apply scheduling restrictions so that they don't use the same frequency resources in their cell borders, basically creating a partial frequency reuse in the cell border areas.

According to an aspect of the disclosure, the radio link related information is received from a neighboring first access node, a neighboring second access node or/and the UE/STA. According to an aspect of the disclosure, the radio link related information is an interference indicator.

Coordinated control is now further exemplified. Inter-cell Interference Co-ordination, ICIC, is a mechanism by which cells consider the interference from and to neighbouring cells in their scheduling decisions. Since the eNBs are fully responsible for their scheduling decisions (i.e. no higher level entity like RNC in UMTS for performing scheduling), ICIC requires some messages to communicate scheduling and interference situations between neighbouring eNBs. 3GPP has already specified X2 messages for facilitating this. These messages or corresponding messages may be used over the WLAN-X2 interface.

For ICIC in the UL direction, two X2 information elements, IE, are available as part of the X2: LOAD INFOR- MATION message namely UL High Interference Indicator, HII, and UL Interference Overload Indicator, OI.

"UL High Interference Indicator" is an IE that may be sent by an eNB to its neighbours to inform them about the UL physical resource blocks, PRBs, that it is planning to grant to its cell edge UEs (in the UL) in the near future. The eNBs response on receiving this message is left up to implementation, but one possible reaction could be to refrain (for a certain duration) from granting the PRBs indicated as interference sensitive in the HII to their cell edge UEs, as those PRBs are expected to experience strong UL interference from the cell edge UEs of the neighbour eNB that sent out the HII message.

According to an aspect of the disclosure, the interference indicator is an uplink, UL, high interference indicator, HII or an uplink, UL, interference overload indicator, OI, received from a neighboring first access node.

"UL Interference Overload Indicator" indicates the uplink interference level experienced by a cell on each UL PRBs. Therefore this IE will be typically sent by an eNB victim of UL interference to an eNB acting as interference aggressor. For each PRB, the level of interference can be assigned to low, medium or high. The response to receiving the OI IE is also left up to implementation, but a possible reaction could be for a neighbour to schedule more on the PRBs reported to experience low level of interference and less on the PRBs experiencing high levels of interference until the situation is resolved (for example, neighbour sends out another OI indicating there are few or no PRBs experiencing high interference).

According to an aspect of the disclosure, the UL HII or UL OI is a representation of an interference level from a neighboring second access node.

Hence, according to the proposed method, similar mechanisms as in LTE are used to enable tighter interference co-ordination between access points using different radio access technologies, e.g. WLAN and 3GPP.

In LTE, the UL HII currently is used to by an eNB to tell its neighbouring eNBs where the eNB cells are experiencing higher interference, so that the neighbouring cells can try not to schedule their cell edge UEs at the PRBs indicating high interference. So in the context of this disclosure, if a UL HII from a neighbour eNB is received, an eNB can decide (or recommend) to switch the operating frequency of the APs that are near the border of the cell (i.e. the neighbour cell that the UL HII refers to) from 2.4 to 5 Ghz or switch the channels that are used to a different one that will cause less interference. Similarly if an AP is also suffering from interference, it can communicate this info to the eNB that it has an X2-WLAN communications interface with, and the eNB can translate this to a UL HII message and communicate it to the neighbouring eNBs. Similar approaches can be made in the usage of the OI.

For the DL, an X2 IE called the Relative Narrowband Transmit Power (RNTP) indicator has been defined as part of the X2: LOAD INFORMATION message. The RNTP includes a bitmap, where each bit (corresponding to each PRB) indicates whether the eNB is planning to keep the transmit power of the PRB below a certain threshold (known as RNTP threshold, which is also included in the RNTP message). A bitmap value of "0" can be considered as a promise by the eNB not to use a power level higher than the RNTP threshold. The promise is expected to be kept by the cell until a future RNTP message tells otherwise.

The RNTP threshold can take one of these values in dB, as defined in [2]:

$$RNTP_{threshold} \in \{-\infty, -11, -10, -9, -8, -7, -6, -5, -4, -3, -2, -1, 0, +1, +2, +3\}$$

For example, if the RNTP threshold is $-\infty$, this can be considered as a promise by the cell to its neighbours that it won't transmit any data on all the PRBs flagged with a "0" bitmap. A threshold value of 0 dB means that less than the maximum transmit power will be used on the PRBs flagged with a "0" bitmap, while a threshold value of +3 indicates that the PRBs flagged with a "1" are actually going to use power boosting up to 50% higher than the maximum transmission power for the cell sending the bitmap.

Thus the RNTP can be considered as the DL equivalent of the UL HII (but with more information, since the HII doesn't provide any thresholds), as it provides the relative interference to be experienced at particular PRBs.

According to an aspect of the disclosure, the relative narrowband transmit power, RNTP, is a representation of an interference level from a neighboring second access node.

Turning back to FIG. 1, in this disclosed example, there are several dual-band (2.4 GHz and 5 GHz) APs 30 under the coverage of one eNB cell and the APs communicate with the eNB using the X2-WLAN interface. A dual-mode UE/STA 40*a* is within coverage of an eNB 20*a* and a AP 30*a*3.

In the disclosed scenario, the APs provides dynamic radio-related information to the eNB (air load per band, backhaul load, current channel used, number of connected clients, etc.) via the X2-WLAN interface. Thus, the resource management related information represents an air load per band, backhaul load, current channel used or/and a number of on-going connections to the second access node. Having such information, the eNB can make an informed RAN steering decision regarding a particular UE/STA.

Another set of functionality for the X2-WLAN interface is dynamic configuration setting—for example the transmission power of the APs could be controlled by the eNB based on various factors (e.g., interference reported by UEs/STAs, load, etc.). In the context of this disclosure, an eNB can decide or recommend to switch the transmission power of the APs that are near the border of the cell (i.e. the neighbor cell that the UL HII refers to) from 2.4 to 5 Ghz or switch the channels that are used to a different one that will cause less interference. Similarly if an AP is also suffering from interference, it can communicate this info to the eNB that it has an X2-WLAN communications interface with, and the eNB can translate this to a RNTP message and communicate it to the neighboring eNBs. According to an aspect of the disclosure, the radio resource control information comprises information on a transmission power level to be used by the second access node.

According to an aspect of the disclosure, the radio resource control information comprises information on an operating frequency to be used by the second access node. According to an aspect of the disclosure, the radio link related information is indicative of a need to perform handover of a radio link connection established between the first access node and a UE/STA.

Figure 2:
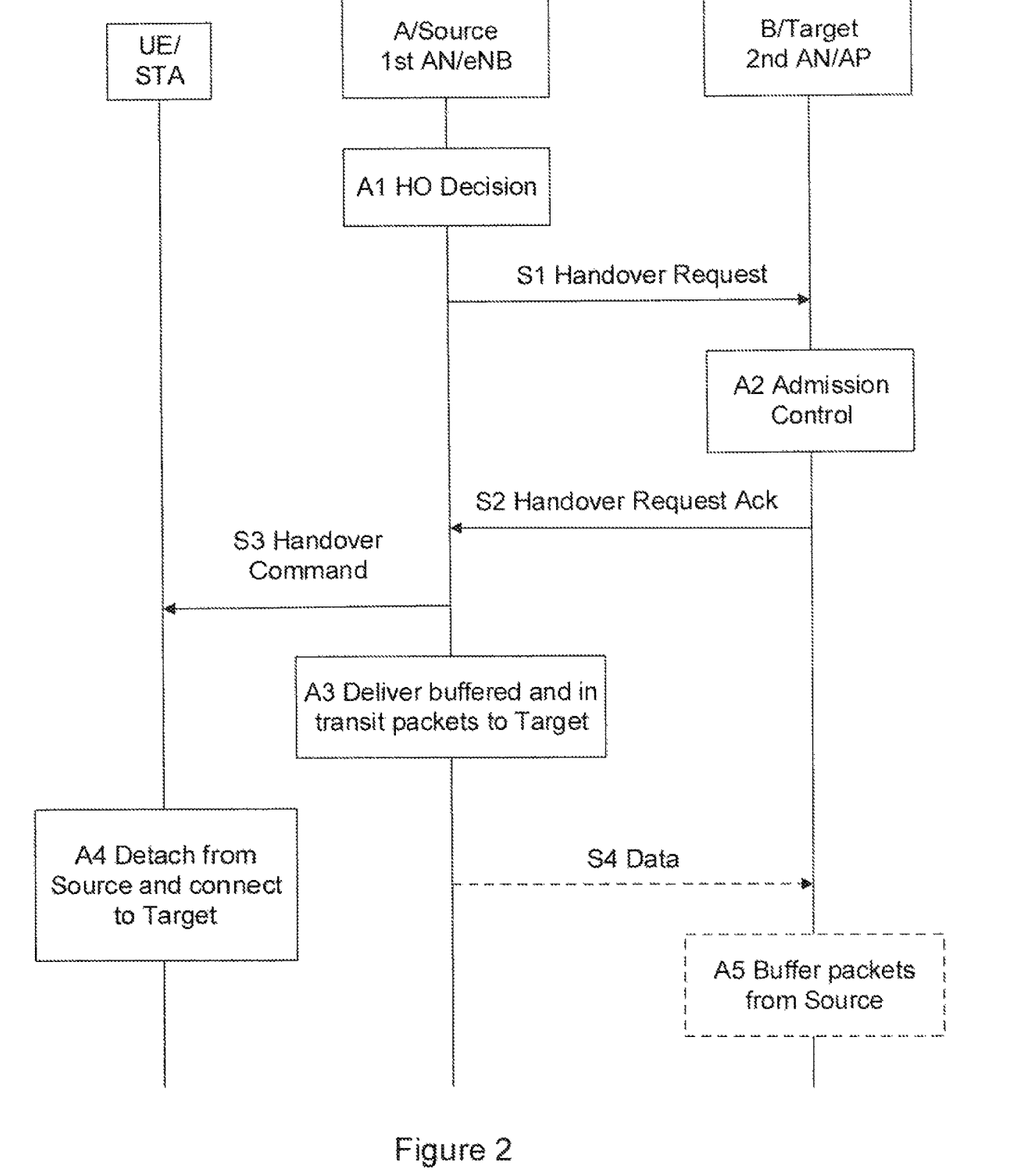
FIG. 2 is a signaling diagram illustrating handover from a first access node, e.g. an eNB to a second access node, e.g. a WLAN AP.

FIG. 2 is a signaling diagram disclosing handover using a direct communications interface between a first and a second access node. The X2-WLAN interface allows for improved hand-over handling when UEs/STAs HO between 3GPP and WLAN. There are several aspects that could be considered including target node preparation, target cancellation, lossless handover assurance, etc.

3GPP→WLAN admission control QoS mapping, etc.
WLAN→3GPP admission control QoS mapping, etc.

The target node preparation refers to the scenario, when a source node A (being either eNB or a WLAN AP) sends a resource reservation request, here illustrated as Handover Request S1, to a target node B (either a WLAN AP or eNB respectively). Following the request, the target node B estimates whether it could accommodate the future connection and responds to the request (here we consider that explicit admission control is implemented in both the 3GPP and WLAN networks).

The target cancellation refers to the scenario, when a source node A (being either eNB or WLAN AP) requests a target node B (either eNB or WLAN AP) to reserve resources for a potential handover (of UE/STA_1). The target node B, having the resources available, accommodates or acknowledges, in a Handover Request Acknowledgement S2, the request and reserves the requested resources. While the target node B expects the UE/STA_1 to perform the HO and start using the resources reserved for it, another UE/STA (UE/STA_2) requests resource allocation (or a network node C performs the request on its behalf). If the case is that the target node B does not have additional resources to accommodate the UE/STA_2 request, and UE/STA_2 has higher "priority" (e.g., gold subscription) as compared to UE/STA_1 (e.g. bronze subscription), the target node B can send a handover cancellation to source node A, indicating that the handover of UE_1/STA_1 can no longer be accommodated. The forwarded data can consist of 3GPP PDCP SDUs or WLAN MAC SDUs (IP packets).

After acknowledgement of the handover by reception of Handover Request Ack, S2 the source node sends a Handover Command S3 to the user equipment. Handover is completed by steps A3-A5.

According to an aspect of the present disclosure, the Handover request from 3GPP eNB to WLAN AP contains information about the QoS parameters of the active traffic at the UE/STA, e.g. detailed information of every individual bearer (e.g. QCI (QoS Class Identifier), Guaranteed Bit Rate (GBR), Maximum Bit Rate (MBR), Allocation Retention Priority (ARP), Traffic Flow Template (TFT), etc.) or/and general information about all the bearers such as A-AMBR (APN aggregate maximum bit rate), UE-AMBR (UE aggregate maximum bit rate), etc. Other QoS related information (for example, user subscription profile information, if available at RAN) could also be included. The AP uses the information provided from the eNB over the X2-WLAN communications interface to reserve some resources to that UE/STA (if possible), or prioritize/de-prioritize traffic (e.g. by changing some WLAN air interface parameters such as back-off timers after carrier sensing or collision detection).

According to an aspect of the disclosure, the step of retrieving resource management related information for the second access node over the communications interface includes transmitting a handover request, S1, from the first access node to the second access node and receiving a handover acknowledgment, S2, from the second access node to the first access node over the communications interface.

According to an aspect of the disclosure, the step of coordinately controlling radio resource use comprises transmitting a handover command S3 to the UE/STA.

According to an aspect of the disclosure, buffered and in transit packets to the second access node are forwarded S35 over the communications interface, here exemplified as data S4, whereupon the second access node buffers the received data.

Figure 4:
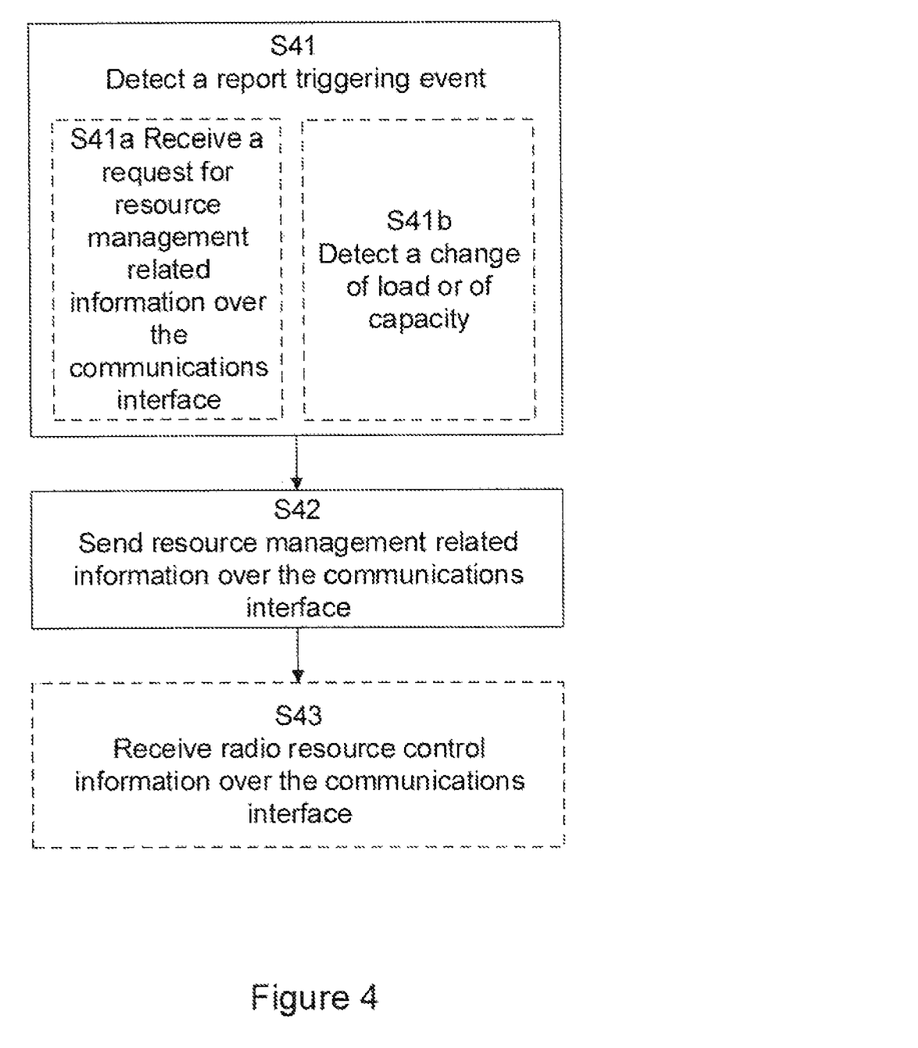
FIG. 4 is a flowchart schematically illustrating embodiments of method steps performed in a second access node, e.g. an WLAN AP.

FIG. 4 is a flowchart schematically illustrating embodiments of method steps performed in a second access node, e.g. an WLAN AP; the second access node having a direct communications interface to a first access node performing the method steps as previously illustrated and described for FIG. 3.

The disclosure presents a method embodiment, performed in a second access node in a wireless network, of controlling radio resources. The second access node is arranged to operate according to a second radio access technology within a second coverage area and to have a communications interface for direct communication with a first access node arranged to operate according to a first radio access technology within a first coverage area. The second coverage area is overlapping with the first coverage area.

The method comprises detecting S41 a report triggering event. In many cases such a report triggering event would be the receipt S41a of a request for resource management related information from the first access node over the communications interface, but report triggering events also include a detection S41b of a change of load or capacity in the second access node, e.g. that the load is above or below one or more predetermined levels set for the second access node, that capacity has dropped below one or more predetermined levels, that the node has been stopped or started, or that one or more UE/STAs have been released due to high load. Load can be expressed e.g. in terms of one or more of: occupied percentage of air interface, occupied percentage of backhaul, occupied percentage of processing capacity, number of connected and active users, expected bit rate for an added user (given certain path loss etc), rejection ratio for access attempts, expected latency before admission. The above can, when applicable, be defined separately for UL/DL and/or per QoS class. Capacity can be expressed e.g. in terms of expected total bit rate capacity of air interface (given certain path loss etc), ditto for backhaul, and ditto for processing capacity. The above can, when applicable, be divided e.g. per UL/DL and/or per QoS class. Following the report triggering event, the requested resource management related information is sent S42 to the first access node over the X2-WLAN communications interface.

If an AP wants to configure UE/STA to perform measurement reporting, the AP can use information of the identities of the WLAN APs for whom the measurements should be carried. In this way the UE/STA can look for particular APs and not sweep across all channels and bands, which would improve resource efficiency (in terms of battery, system efficiency, measurement latency, etc.). According to an aspect of the disclosure, the resource management related information includes measurements relating to one or more neighboring second access nodes, each having respective communications interfaces with the first access node.

According to an aspect of the disclosure, radio resource control information is received S43 from the first access node over the communications interface, the radio resource control information coordinately generated based on resource management related information for the second access node, radio link related information relevant for radio link connections to the first access node, and resource management related information for the first node.

According to an aspect of the disclosure the radio link related information relevant for radio link connections to the first access node is an interference indicator.

According to an aspect of the disclosure the radio link related information is indicative of a need to perform handover of a radio link connection established between the first access node and a UE/STA.

According to an aspect of the disclosure, the first access node is an access node of a cellular radio access network and the second access node is an access point of a local area network. However, the disclosure is also applicable to the situation where the first access node is an access point of a local area network and the second access node is an access node of a cellular radio access network as long as the first access node exercises the control of the radio resources provided to the dual-mode user equipment UE/STA.

Figure 5:
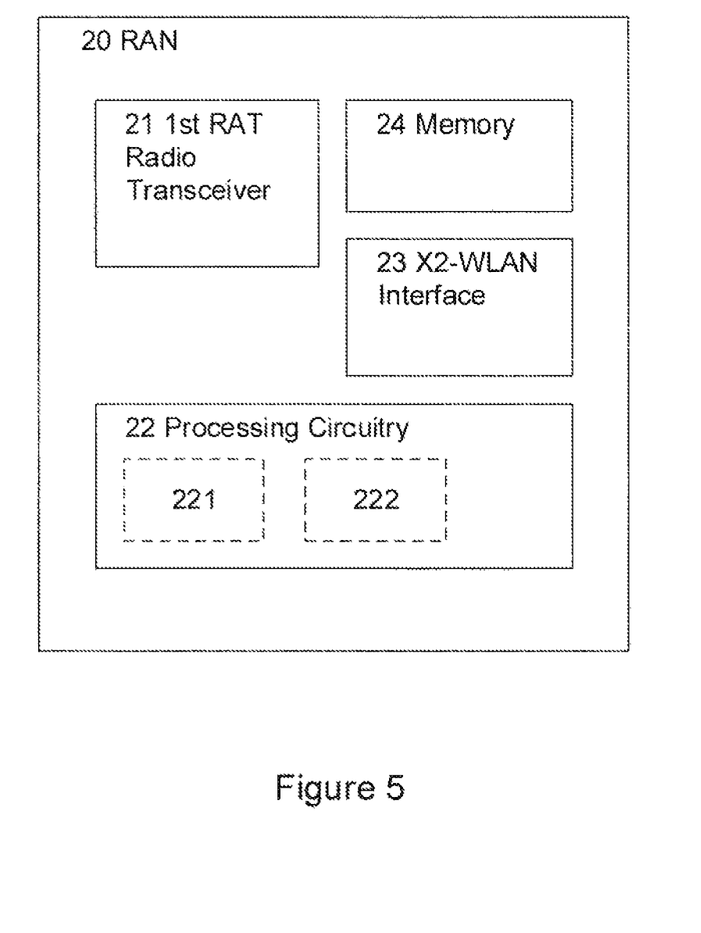
FIG. 5 is a block diagram schematically illustrating a first access node, for performing the methods.

Turning now to FIG. 5, a schematic diagram illustrates some modules of an exemplary embodiment of a first access node 20, e.g. an eNB 20a-c deployed in the network set-up illustrated in FIG. 1. The first access node 20 is configured for controlling usage of radio resources for at least one user equipment, UE/STA, being within a coverage of the first access node, wherein the UE/STA is also within coverage of one or more second access nodes, e.g. WLAN AP:s 30a1-a3, 30b, 30c1-c2 and 30d of FIG. 1, arranged to operate according to a second radio access technology and wherein there is a communications interface, X2-WLAN, arranged for direct communication between the first access node 20 and the respective second access node as illustrated in FIG. 1.

In this application the term access node is generally used. An access node is any node in a cellular network being configured to communicate with user equipments over a radio access technology. The access node is e.g. an eNodeB in a LTE network. The access node comprises a radio transceiver 21, processing circuitry 22, a communications interface 23 for node-to-node communication and a memory 24.

The radio transceiver 21 is arranged for radio communication with a dual mode user equipment, UE/STA, within a coverage area of the first access node 20 over a first radio access technology.

The communication interface 23 is configured for wireless or wired communication with other access nodes, 30. The communication interface includes a receiver configured to receive resource management related information and a transmitter configured to transmit radio resource control information to one or more second access nodes arranged to operate according to a second radio access technology.

The controller, CTL, or a processing circuitry 22 may be constituted by any suitable Central Processing Unit, CPU, microcontroller, Digital Signal Processor, DSP, etc. capable of executing instructions in the form of computer program code. The instructions may be stored in a memory 24. The memory 24 can be any combination of a Read And write Memory, RAM, and a Read Only Memory, ROM. The memory 24 may also comprise persistent storage, which, for example, can be any single one or combination of magnetic memory, optical memory, or solid state memory or even remotely mounted memory.

The first access node 20 is arranged to control radio resource use of the first and the second access node for a dual-mode user equipment, UE/STA, within the first and the second coverage area based on the received radio link related information, resource management related information and internal resource management related information for the first access node.

When executing the instructions in the processing circuitry 22 of the access node 20, the access node 20 is operative to retrieve resource management related information of the second access node relevant for the at least one user equipment UE/STA over the communications interface and coordinately control radio resources provided to the dual-mode user equipment, UE/STA, by both the first and the second access node, based on the retrieved resource management related information and internal resource management related information for the first node.

According to one aspect of the disclosure, the processing circuitry 22 comprises one or several of:

a receiver module 221 configured to retrieve resource management related information of the second access node relevant for the at least one user equipment UE/STA over the communications interface; and a control module 222 configured to coordinately control radio resources provided to the dual-mode user equipment, UE/STA, by both the first and the second access node, based on the retrieved resource management related information and internal resource management related information for the first node.

The receiver module 221 and the control module 222, are implemented in hardware or in software or in a combination thereof. The modules 221, 222 are according to one aspect implemented as a computer program stored in the memory 24 which run on the processing circuitry 22. The access node 20 is further configured to implement all the aspects of the disclosure as described in relation to the methods above.

Figure 6:
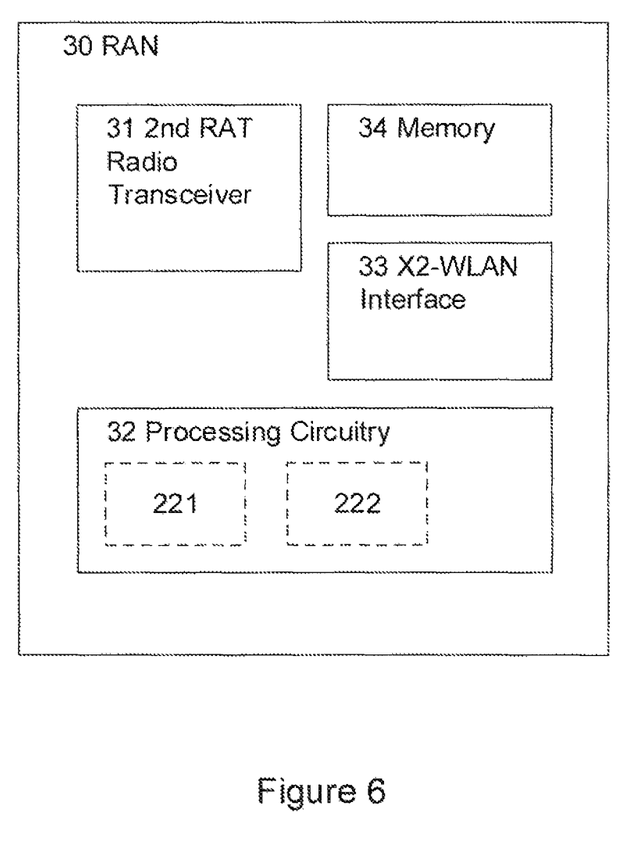
FIG. 6 is a block diagram schematically illustrating a second access node, for performing the methods.

Turning now to FIG. 6, a schematic diagram illustrates some modules of an exemplary embodiment of a second access node 30, e.g a WLAN AP 30a1-a3, 30b, 30c1-c2 and 30d deployed in the network set-up illustrated in FIG. 1. The second access node 30 is configured for controlling usage of radio resources for at least one user equipment, UE/STA, being within a coverage of the second access node, wherein the UE/STA is also within the coverage of a first access node, e.g. eNB 20a-c of FIG. 1, arranged to operate according to a first radio access technology, according to the method described in relation to FIG. 4 above. The second access node 30 comprising a radio transceiver 31, a processing circuitry 32, a communications interface 33, and a memory 34.

The radio transceiver 31 is arranged for radio communication with a dual mode user equipment, UE/STA, within a coverage area of the second access node 30 over a second radio access technology.

The X2-WLAN communication interface 23 is configured for wireless or wired communication with other access nodes, 20. The communication interface includes a receiver configured to receive resource management related information and a transmitter configured to transmit radio resource control information to one or more second access nodes arranged to operate according to a first radio access technology.

The controller, CTL, or a processing circuitry 32 may be constituted by any suitable Central Processing Unit, CPU, microcontroller, Digital Signal Processor, DSP, etc. capable of executing instructions in the form of computer program code. The instructions may be stored in a memory 34. The memory 34 can be any combination of a Read And write Memory, RAM, and a Read Only Memory, ROM. The memory 34 may also comprise persistent storage, which, for example, can be any single one or combination of magnetic memory, optical memory, or solid state memory or even remotely mounted memory.

When executing the instructions in the processing circuitry 32 of the access node 30, the access node 30 is operative to detect a report triggering event, e.g. receive a request for resource management related information from the first access node over the communications interface; and send resource management related information to the first access node over the communications interface.

According to one aspect of the disclosure, the processing circuitry comprises one or several of:

an event detection module 321 configured to detect a report triggering event; and a sender module 322 configured to send resource management related information to the first access node over the communications interface.

The event detection module 321 and the sender module 322 are implemented in hardware or in software or in a combination thereof. The modules 321, 322 are according to one aspect implemented as a computer program stored in the memory 34 which run on the processing circuitry 32. The access node 30 is further configured to implement all the aspects of the disclosure as described in relation to the methods above.

ABBREVIATIONS

3GPP 3$^{rd}$ Generation Partnership Project
A-AMBR APN AMBR
AC Access Controller
AMBR Aggregate Maximum Bit Rate
ANQP Access Network Query Protocol
AP Access Point
APN Access Point Name
ARP Allocation and Retention Priority
BSSID Basic Service Set ID
CDMA Code Division Multiple Access
CN Core Network
DNS Domain Name Service
E-UTRAN Evolved Universal Terrestrial Radio Access Network
eNB E-UTRAN NodeB (Base station)
EPC Evolved Packet Core
ESSID Extended Service Set ID
FQDN Fully Qualified Domain Name
GCID Global cell ID
GBR Guaranteed Bit Rate
HII High Interference Indicator
HO Handover
HSPA High Speed Packet Access
ICIC Inter-cell Interference Co-ordination
IE Information Element
LTE Long Term Evolution
MAC Medium Access Control
MME Mobility Management Entity
NAS Non Access Stratum
O&M Operation and Management
OI Overload Indication
P-GW Packet Gateway
PCI Physical Cell ID
PDCP Packet Data Convergence Protocol
PLMN Public Land Mobile Network
PRB Physical Resource Block
QCI QoS Class Indicator
QoS Quality of Service
RAN Radio Access Network
RNTP Relative Narrowband Transmit Power
RNC Radio Network Controller
RRM Radio Resource Manger
SDU Service Data Unit
SINR Signal to Interference plus Noise Ratio
S-GW Serving Gateway
STA Station
TFT Traffic Flow Template
UE User Equipment
UMTS Universal Mobile Telecommunication System
Wi-Fi/WLAN Wireless Local Area Network
WCDMA Wideband CDMA

The invention claimed is:

1. A method, performed in a first access node arranged to operate according to a first radio access technology, of controlling usage of radio resources for at least one user equipment (UE) being within a coverage of the first access node, wherein the at least one UE is also within coverage of one or more second access nodes arranged to operate according to a second radio access technology and wherein there is a communications interface arranged for direct communication between the first access node and a second access node of the one or more second access nodes, the method comprising:

retrieving, from the second access node, resource management related information of the second access node relevant for the at least one UE over the communications interface;

coordinately controlling radio resources provided to the at least one UE, operating as a dual-mode UE, by both the first access node and the second access node, based on the retrieved resource management related information and internal resource management related information for the first access node; and transmitting radio resource control information to the second access node over the communications interface, the radio resource control information comprising information on a transmission power level and an operating frequency to be used by the second access node in communicating with the at least one UE and coordinately generated based on the resource management related information for the second access node, radio link related information relevant for radio link connections to the first access node, and the resource management related information for the first access node.

2. The method of claim 1, further comprising sending a request for the resource management related information to the second access node.

3. The method of claim 1, wherein the step of retrieving comprises receiving the resource management related information in response to sending a request for the resource management related information or without prior solicitation.

4. The method of claim 1, wherein the resource management related information represents one of an air load per band, backhaul load, current channel used, and a number of on-going connections to the second access node.

5. The method of claim 1, further comprising receiving the radio link related information.

6. The method of claim 5, wherein the radio link related information is indicative of a need to perform handover of a radio link connection established between the first access node and a UE.

7. The method of claim 5, wherein the radio link related information is received from one of a neighboring first access node, a neighboring second access node and the at least one UE.

8. The method of claim 5, wherein the radio link related information is an interference indicator.

9. The method of claim 8, wherein the interference indicator is one of an uplink (UL) high interference indicator (HII) and a UL interference overload indicator (CH) received from a neighboring first access node.

10. The method of claim 9, wherein the one of the UL HII and the UL 01 is a representation of an interference level from a neighboring second access node.

11. The method of claim 1, wherein the step of retrieving resource management related information for the second access node over the communications interface includes transmitting a handover request from the first access node to the second access node and receiving a handover request acknowledgment from the second access node to the first access node over the communications interface.

12. The method of claim 11, wherein the handover request comprises Quality of Service (QoS) related information arranged to be used by the second access node in a reservation of resources.

13. The method of claim 12, wherein the step of coordinately controlling radio resource use comprises transmitting a handover command to the at least one UE.

14. The method of claim 11, further comprising forwarding buffered and in transit packets to the second access node over the communications interface.

15. The method of claim 1, wherein one of control, transmission and reception of downlink radio link resources is decoupled from one of control, transmission and reception of uplink radio link resources.

16. The method of claim 1, wherein the first access node is an access node of a cellular radio access network and the second access node is an access point of a local area network.

17. The method of claim 1, wherein coverage of the second access node extends over a subarea or a partial subarea of coverage provided by the first access node.

18. The method of claim 1, wherein the first access node is an access point of a local area network and the second access node is an access node of a cellular radio access network.

19. The method of claim 1, wherein coverage of the first access node extends over a subarea or a partial subarea of coverage provided by the second access node.

20. A method, performed in a second access node arranged to operate according to a second radio access technology, of controlling usage of radio resources for at least one user equipment (UE) being within a coverage of the second access node, wherein the at least one UE is also within the coverage of a first access node arranged to operate according to a first radio access technology and wherein there is a communications interface arranged for direct communication between the second access node and the first access node, the method comprising:
  detecting a report triggering event;
  responsive to detecting the report triggering event, sending resource management related information relevant for the at least one UE to the first access node over the communications interface; and
  receiving radio resource control information from the first access node over the communications interface, the radio resource control information comprising information on a transmission power level and an operating frequency to be used by the second access node in communicating with the at least one UE and coordinately generated based on the resource management related information for the second access node, radio link related information relevant for radio link connections to the first access node, and the resource management related information for the first access node.

21. The method of claim 20, wherein the report triggering event is:
  receiving a request for resource management related information from the first access node over the communications interface.

22. The method of claim 20, wherein detecting the report triggering event comprises:
  detecting a change of load or capacity in the second access node.

23. The method of claim 20, wherein the resource management related information includes measurements relating to one or more neighboring second access nodes, each having respective communications interfaces with the first access node.

24. The method of claim 20, wherein the radio link related information relevant for radio link connections to the first access node is an interference indicator.

25. The method of claim 20, wherein the radio link related information relevant for radio link connections to the first access node is indicative of a need to perform handover of a radio link connection established between the first access node and a UE.

26. The method of claim 20, wherein the first access node is an access node of a cellular radio access network and the second access node is an access point of a local area network.

27. The method of claim 20, wherein coverage of the second access node extends over a subarea or a partial subarea of coverage provided by the first access node.

28. The method of claim 20, wherein the first access node is an access point of a local area network and the second access node is an access node of a cellular radio access network.

29. The method of claim 20, wherein coverage of the first access node extends over a subarea or a partial subarea of coverage provided by the second access node.

30. A first access node arranged to operate according to a first radio access technology, and being configured to control usage of radio resources for at least one user equipment (UE) being within a coverage of the first access node, wherein the at least one UE is also within coverage of one or more second access nodes arranged to operate according to a second radio access technology, the first access node comprising:
  a radio transceiver arranged for radio link communication with the at least one UE, operating as a dual-mode UE, within a coverage area of the first access node over a first radio access technology;
  a communication interface arranged for direct communication with the one or more second access nodes; and
  processing circuitry configured to:
    retrieve, from a second access node of the one or more second access nodes, resource management related information of the second access node of the one or more second access nodes relevant for the at least one UE over the communications interface;
    coordinately control radio resources provided to the at least one UE by both the first access node and the second access node, based on the retrieved resource management related information and internal resource management related information for the first access node; and
    transmit radio resource control information to the second access node over the communications interface, the radio resource control information comprising information on a transmission power level and an operating frequency to be used by the second access node in communicating with the at least one UE and coordinately generated based on the resource management related information for the second access node, radio link related information relevant for radio link connections to the First access node, and the resource management related information for the first access node.

31. The first access node of claim 30, wherein the first access node is an access node of a cellular radio access network.

32. The first access node of claim 30, wherein the first access node is an access point of a local area network.

33. A non-transitory computer readable storage medium storing a computer program for controlling usage of radio resources for at least one user equipment (UE) being within a coverage of a first access node arranged to operate according to a first radio access technology, wherein the at least one UE is also within coverage of one or more second access nodes arranged to operate according to a second radio access technology and wherein there is a communications interface arranged for direct communication between the first access node and a second access node of the one or more second access nodes, the computer program comprising computer readable code that, when run in at least one processor of the first access node, causes the first access node to:
- retrieve, from the second access node, resource management related information of the second access node relevant for the at least one UE over the communications interface;
- coordinately control radio resources provided to the at least one UE by both the first access node and the second access node, based on the retrieved resource management related information and internal resource management related information for the first access node; and
- transmit radio resource control information to the second access node over the communications interlace, the radio resource control information comprising information on a transmission power level and an operating frequency to be used by the second access node in communicating with the at least one UE and coordinately generated based on the resource management related information for the second access node, radio link related information relevant for radio link connections to the first access node, and the resource management related information for the first access node.

34. A second access node arranged to operate according to a second radio access technology, and configured to control usage of radio resources for at least one user equipment (UE) being within a coverage of the second access node, wherein the at least one UE is also within the coverage of a first access node arranged to operate according to a first radio access technology, the second access node comprising:
- a radio transceiver arranged for radio link communication with the at least one UE, operating as a dual-mode UE, within a coverage area of the second access node over a second radio access technology;
- a communication interface arranged for direct communication with the first access node; and
- processing circuitry configured to:
- detect a report triggering event;
- responsive to detecting the report triggering event, send resource management related information relevant for the at least one UE to the first access node over the communications interface; and
- receive radio resource control information from the first access node over the communications interface, the radio resource control information comprising information on a transmission power level and an operating frequency to be used by the second access node in communicating with the at least one UE and coordinately generated based on the resource management related information for the second access node, radio link related information relevant for radio link connections to the first access node, and the resource management related information for the first access node.

35. The second access node of claim 34, wherein the second access node is an access point of a local area network.

36. The second access node of claim 34, wherein the second access node is an access node of a cellular communications network.

37. A non-transitory computer readable storage medium storing a computer program for controlling usage of radio resources for at least one user equipment (UE) being within a coverage of a second access node, wherein the at least one UE is also within the coverage of a first access node arranged to operate according to a first radio access technology and wherein there is a communications interface arranged for direct communication between the second access node and the first access node, the computer program comprising computer readable code that, when executed by processing circuitry in the second access node, causes the second access node to;
- detect a report triggering event;
- responsive to detecting the report triggering event, send resource management related information relevant for the at least one UE to the first access node over the communications interface; and
- receive radio resource control information from the first access node over the communications interface, the radio resource control information comprising information on a transmission power level and an operating frequency to be used by the second access node in communicating with the at least one UE and coordinately generated based on the resource management related information for the second access node, radio link related information relevant for radio link connections to the first access node, and the resource management related information for the first access node.

* * * * *